United States Patent [19]

Tsukada

[11] Patent Number: 5,112,139
[45] Date of Patent: May 12, 1992

[54] ROLLER TYPE LINEAR MOVEMENT GUIDE BEARING

[75] Inventor: Toru Tsukada, Maebashi, Japan

[73] Assignee: Nippon Seiko Kabushiki Kaisha, Tokyo, Japan

[21] Appl. No.: 675,752

[22] Filed: Mar. 27, 1991

[30] Foreign Application Priority Data

Mar. 28, 1990 [JP] Japan .................................. 32664[U]

[51] Int. Cl.⁵ ............................................... F16K 29/06
[52] U.S. Cl. ............................................ 384/15; 384/44
[58] Field of Search ................... 384/15, 44, 45, 43; 464/168

[56] References Cited

U.S. PATENT DOCUMENTS

| | | | |
|---|---|---|---|
| 4,828,402 | 5/1989 | Osawa | 384/15 |
| 4,886,376 | 12/1989 | Osawa | 384/15 |
| 4,918,846 | 4/1990 | Tsukada | 384/15 |
| 5,044,780 | 9/1991 | Teramachi | 384/44 |

Primary Examiner—Lenard A. Footland
Attorney, Agent, or Firm—Basile and Hanlon

[57] ABSTRACT

A linear movement guide bearing including a main body accommodating a pair of side by side roller trains is linearly movable in an axial direction along a raceway surface through rolling of the roller trains. A pair of side protection covers formed of metal plates are attached to the main body to respectively cover substantially the whole lateral sides of the main body and end caps which are fixed to axial opposite ends of the main body. A pair of end protection covers formed of metal plates are respectively fixed to outer end surfaces of the end caps to protect the end caps. The side and end protection covers insure the mechanical strength of the guide bearing against external impacts. Seal members are respectively attached to lower edges of the side and end protection covers to seal clearances between the lower edges of the protection covers and the raceway surface.

2 Claims, 3 Drawing Sheets

ROLLER TYPE LINEAR MOVEMENT GUIDE BEARING

BACKGROUND OF THE INVENTION

1. Field of the Invention

The present invention relates to a roller type linear guide bearing having dust seals and protection covers.

2. Description of the Art

A prior art roller type linear movement guide bearing includes a roller train having a plurality of rollers infinitely circulating while rolling in contact with a raceway surface, a main body supporting a load through the roller train and having side surfaces for guiding the roller train, and end caps for making a U-turn of the roller train at opposite ends of the main body. The roller type linear movement guide bearing is linearly movable in an axial direction along the raceway surface with which the roller train is in contact.

Such a roller type linear movement guide bearing is used by being interposed between a table and a raceway surface of a guide rail or a bed so that the table performs a reciprocating linear movement smoothly and lightly along the raceway surface.

However, in the prior art roller type linear movement guide bearing, the end caps at opposite ends of the bearing are exposed to the outside without any protection covers. Furthermore, since the end caps are synthetic resin molded products in order that the curved paths for enabling the roller train to make a U-turn are easily formed, the mechanical strength of the end caps is low. As a result, a problem is involved in that when the linear movement guide bearing accidentally falls on the floor, or when an article inadvertently strikes the bearing, the linear movement guide bearing can be damaged.

Furthermore, when dust or cuttings intrude into the inside of the linear movement guide bearing, the function of the bearing will be seriously affected. Accordingly, it is necessary to use a dust seal. However, in the prior art, since the dust seal is not built in the roller type linear movement guide bearing, the user himself must procure an outside-fitted seal and attach it suitably. Thus, there is a problem in that the attaching is cumbersome and requires manhours of labor and this in turn makes the use of the roller type linear movement guide bearing itself inconvenient.

FIGS. 6 and 7 show an example of one way of attaching a prior art dust seal. A roller type linear movement guide bearing 1 is mounted within a recess 5 provided in a table 4 such that a roller train 2 is in contact with a raceway surface 3. A slant surface sliding mechanism 6 for applying a preload is interposed between the table 4 and the linear movement guide bearing 1. A dust seal 7 for an axial end of the roller type linear movement guide bearing 1 is attached to a cover 8 of the recess 5 of the table 4 and seals a clearance between the cover 8 and the raceway surface 3. Further, a dust seal 9 for a lateral side of the linear movement guide bearing 1 is attached through a spring 11 within a seal groove 10 formed in a lower surface of the table 4 and seals a clearance between the table 4 and the raceway surface 3.

Furthermore, since the space of the recess 5 of the table 4 partitioned from the outside by the outside-fitted seals 7 and 10 is filled with a large amount of grease surrounding the roller type linear movement bearing 1, the cost of maintenance is high.

SUMMARY OF THE INVENTION

The present invention was made in view of the above-mentioned problems in the prior art, and it is an object of the invention to provide a roller type linear movement bearing which is provided with protection covers to cover end surfaces and side surfaces of the linear movement bearing and which is provided with seal members to seal clearances between the protection covers and a raceway surface.

The present invention is an improvement in a roller type linear guide bearing capable of linear movement in an axial direction along a raceway surface. The roller type linear guide bearing includes a pair of roller trains each having a plurality of rollers infinitely circulating while rolling in contact with the raceway surface, a main body supporting a load through the roller trains and having side surfaces for guiding the roller trains, and end caps for making a U-turn of the roller trains at opposite ends of the main body. The improvement comprises a pair of side protection covers for covering the whole lateral sides of the main body and the side surfaces of the end caps and for guiding the roller trains, a pair of end protection covers for covering the axial ends of the end caps, a first pair of seal members respectively fixed to lower edges of the pair of side protection covers so as to be in slidable contact with the raceway surface, and a second pair of seal members respectively fixed to lower edges of the pair of end protection covers so as to be slidably in contact with the raceway surface.

In the present invention, since the end surface and the side surfaces of each of the end caps are covered by the end and side protection covers, even when the roller type linear movement bearing falls on the floor, or when an article strikes the roller type linear movement bearing, the bearing is not damaged or broken.

Furthermore, the seal members are fixed to the lower edges of the end and side protection covers for sealing the clearance between the lower edges and the raceway surface, specifically in a manner such that the seal members are built in, or contained in the roller type linear movement bearing. Accordingly, the user is not required to procure outside-fitted seal members or to attach the outside-fitted seal members to the table or the like. Thus, the use of the roller type linear movement bearing is facilitated.

Moreover, it is only needed to add grease in a small space in the inside of the bearing enclosed by the protection covers. Thus, the cost of maintenance is low.

DESCRIPTION OF THE PREFERRED EMBODIMENT

FIGS. 1 to 5 show an embodiment of the present invention.

Figure 1:
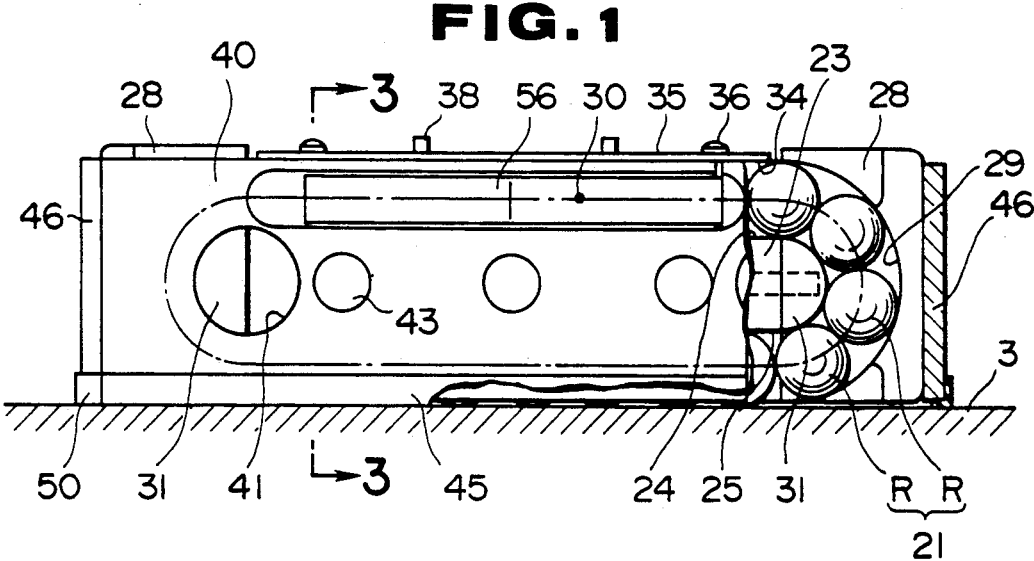
FIG. 1 is a partially cut away side view of a roller type linear movement guide bearing of an embodiment of the present invention.
Figure 2:
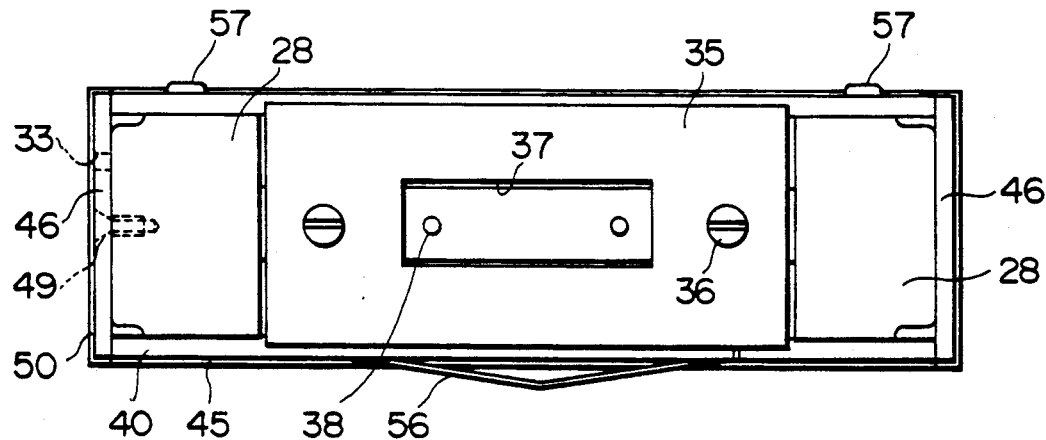
FIG. 2 is a plan view of the roller type linear movement guide bearing shown in FIG. 1.

A roller type linear movement guide bearing contains two rows of roller trains 21 each including a plurality of rollers R which are rolling in contact with a raceway surface 3. Each roller R has an inner circumferential edge chamfered to form a slant surface 22 as shown in FIG. 2.

Figure 4:
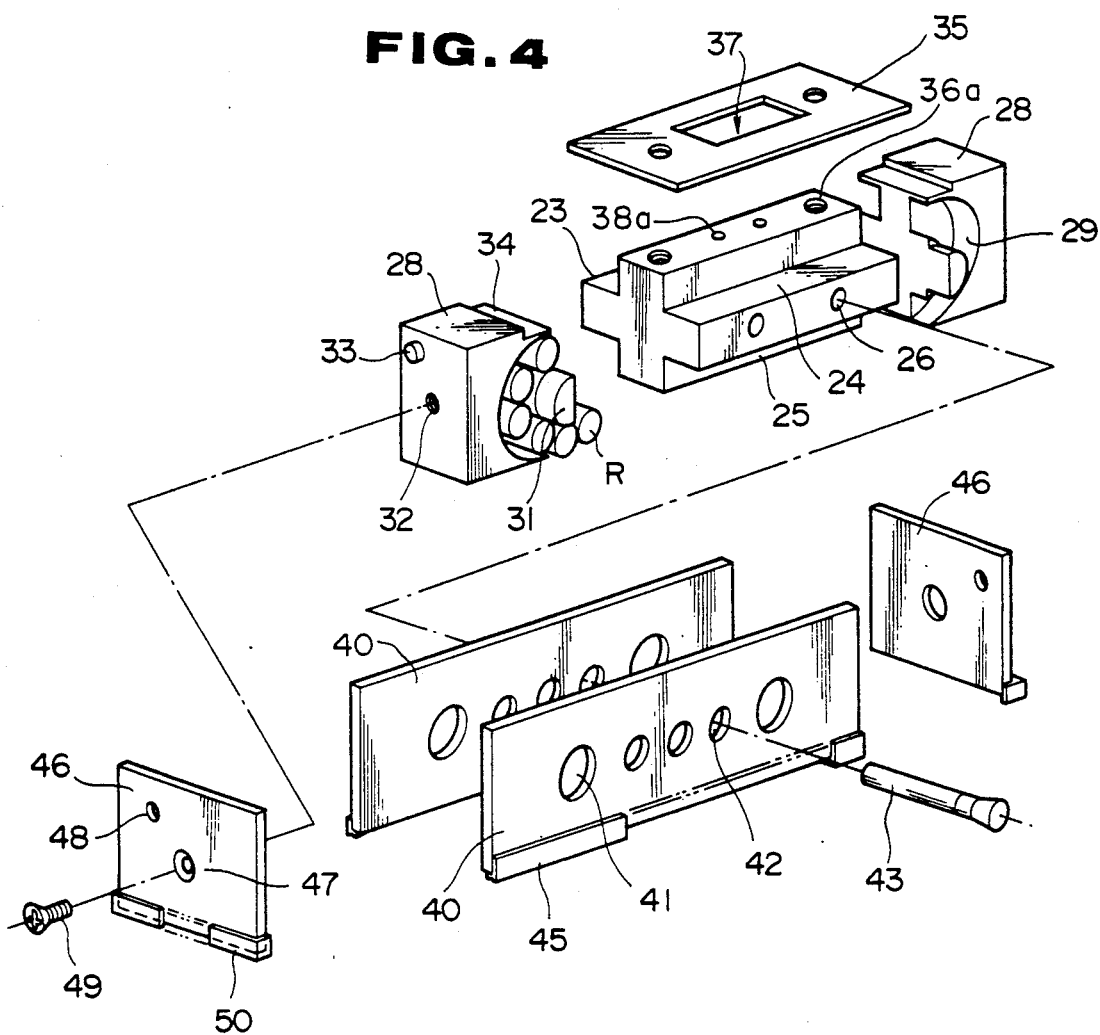
FIG. 4 is a disassembled perspective view of the roller type linear movement guide bearing shown in FIG. 1.

A main body 23 which support a load through the roller trains 21 is made of a metallic material and has a cross-shaped cross section. The cross-shaped vertical and horizontal walls of the main body 21 define four (upper and lower and left and right sides) axially extending recesses. The four recesses constitute roller paths. An upper roller path 24 and a lower roller path 25 both located at one side of the vertical wall of the main body 23 form a pair of roller paths. Two pin holes or bores 26, FIG. 4, are formed in the side of the main body 23 and laterally penetrate the horizontal wall of the main body 23. The main body 23 is also formed with screw bores 36a and spring pin bores 38a.

Figure 6:
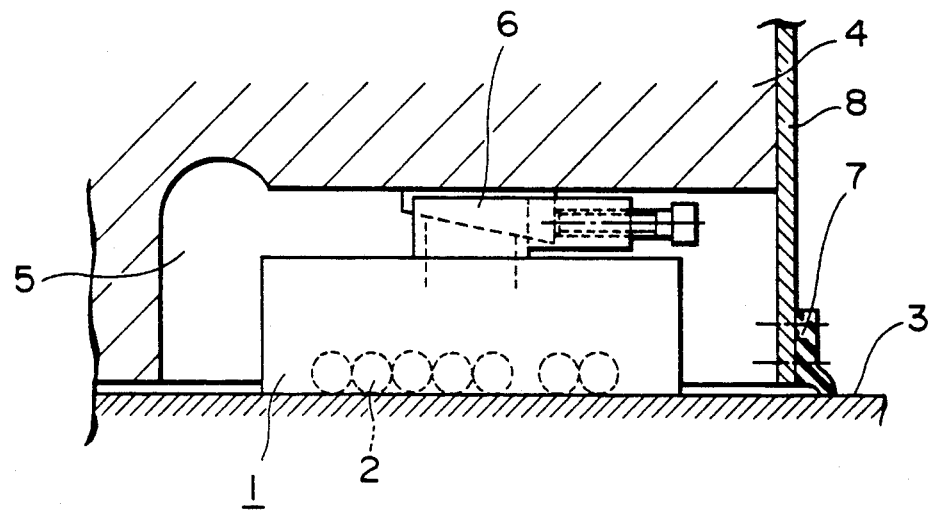
FIGS. 6 and 7 are cross sectional views depicting the sealing means in a prior art roller type linear movement guide bearing.
Figure 7:
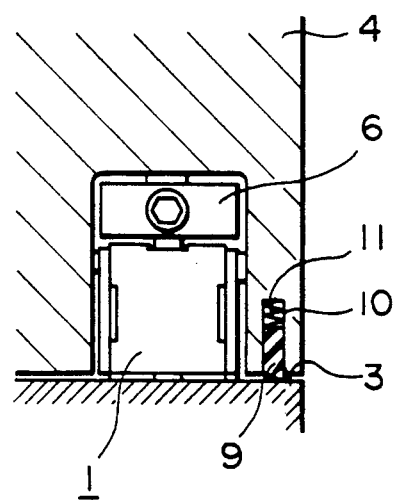

End caps 28 respectively fixed to axial opposite ends of the main body 23 are injection molded products made of a synthetic resin. Each end cap 28 has a pair of curved paths 29 aligned side by side. Each of the curved paths 29 brings the pair of upper and lower roller paths 24 and 25 in communication with each other. The upper and lower roller paths 24 and 25 and the curved paths 29 at opposite ends of the end caps 28 constitute a roller infinitely circulating path 30. Each end cap 28 has a column-like projection 31, FIG. 1, at the center of the curved path 29. The column-like projection 31 has a semicircular arc-shaped surface confronting an inner curved surface of the curved path 29 to guide the rollers R during the circulation of the rollers R. The column-like projection 31 protrudes laterally beyond both side surfaces of the end cap 28 and has the same width as that of the main body 23 to thereby form a holding projection for positioning each of side protection covers 40. Each end cap 28 further has a small projection 33, as shown in FIG. 4, on its outer end surface which is used together with a fixing screw bore 32 to position and fix an end protection cover 46. In an upper surface of the end cap 28, a step surface 34 is formed which is lower than the upper surface. An upper cover 35 is placed on the step surface 34 to cover an upper surface of the main body 23. The upper cover 35 is fixed to the main body 23 by screws 36. The upper cover 35 is formed with an aperture 37 at a center portion thereof. Spring pins 38 embedded in the bores 38a in the upper surface of the main body 23 protrude through the aperture 37. The spring pins 38 are used to position and mount accessories, including the slant surface slide mechanism (FIG. 6) and the like, to the main body 23.

Figure 5:
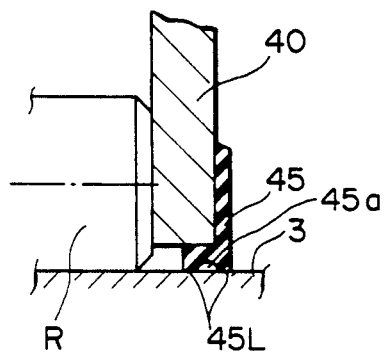
FIG. 5 is an enlarged cross sectional view of a main part of the bearing useful in explaining the structure of the seal member.

Each of the slide protection covers 40 is formed of a metal plate and has a size to cover substantially the whole of a lateral side (including the upper and lower roller paths 24 and 25, and the side surface of the horizontal wall of the main body 23) of the main body 23 and the side surfaces of both end caps 28 at opposite ends of the main body 23. The side cover 40 is formed with circular apertures 41 for fixing the end caps 28 and pin bores 42 for fixing the side protection cover 40 to the main body 23 as shown in FIG. 4. In fixing the side protection cover 40 to the main body 23, after positioning the projections 31 of the end caps 26 in the circular apertures 41, fixing pins 43 are inserted into the pin bores 26 of the main body 23 through the fixing pin bores 42 of the side protection cover 40. The pin end portions of the fixing pins 43 are then caulked. A seal member 45 made of rubber is secured to a lower edge of the side protection cover 40 by deposition, welding or the like, over the whole length of the cover 40. Lip portions 45L of the seal member 45 have a recess 45A formed therebetween on a lower edge of the seal member 45 and extend axially and slidably in contact with the raceway surface 3 as shown in FIG. 5.

Each of the end protection covers 46 is also formed of a metal plate. Each end protection cover 46 has a size to cover the whole of the outer end surface of the end cap 28. A fixing screw bore 47 and a holding bore 48 for the small projection 33 of the end cap 28 are formed in each end protection cover 46. In securing each end protection cover 46 to an end cap 28, after positioning the end cover 46 by holding the small projection 33 in the holding bore 48, the end cover 46 is fixed to the end cap 28 by a screw 49. A seal member 50 made of rubber is secured to a lower edge of the end protection cover 46 over the whole width of the cover 46 and over the side widths of the cover 46 by deposition, welding or the like. Both end portions of the seal member 50, which extend axially towards the pair of side protection covers 40, are respectively joined with end portions of the seal members 45 secured to the lower edges of the side protection covers 40. A lip portion of the seal member 45, similar to the lip portions 45L of the seal member 45, is also slidably in contact with the raceway surface 3.

Figure 3:
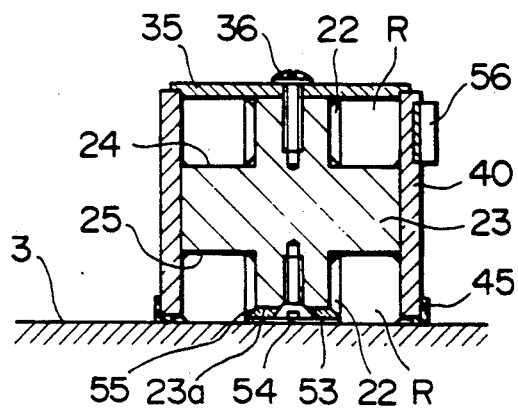
FIG. 3 is a cross sectional view generally taken along line 3—3 in FIG. 1.

A roller holding member 53 is fixed to a lower surface 23a of the main body 23 by a screw 54 as shown in FIG. 3. The roller holding member 53 has both side edges formed in slant surfaces 55. By making the slant surfaces 55 slidably contact the slant surfaces 22 of the laterally adjacent rollers R, the fall off of the rollers R can be prevented.

Furthermore, a leaf spring 56 for mounting the bearing is attached to an outer side surface of one of the side protection covers 40. Mounting reference planes 57 are provided on an outer side surface of the other side protection cover 40.

In the rolling type linear movement guide bearing of this invention, the lateral sides of the main body 23 and the side surfaces of the end caps 28 are covered by the pair of side protection covers 40 formed of metal plates, and the outer end surfaces of the end caps 28 are covered by the pair of end protection covers 46 also formed of metal plates. As a result, even when the rolling type linear movement guide bearing falls onto the floor, or when an article strikes the rolling type linear movement guide bearing, the bearing is not damaged. In particular, since the three sides of the end cap 28 which is made of a synthetic resin having relatively low strength are surrounded by the protection covers 40 and 46, the strength of the end cap is improved to a great extent as compared with the prior art end cap.

Furthermore, the seal members 45 and 50 respectively attached to the lower edges of the side protection cover 40 and the end protection cover 46 are slidably in contact with the raceway surface 3 and prevent foreign matter, such as dust, from intruding into the inside of the bearing through clearances between the lower edges of the bearing and the raceway surface 3. Therefore, the user can save the time and labor previously required to procure and attach the outside-fitting seal and, thus, the use of the roller type linear movement guide bearing is more easily facilitated.

Furthermore, since it is only necessary to fill the small space within the bearing enclosed by the side protection covers 40 with a small amount of grease, the maintenance cost is inexpensive.

The seal members 45 and 50 may also be made of synthetic resin instead of rubber.

As described in the foregoing, in the present invention, the whole sides of the main body and the end caps of the roller type linear movement guide bearing are covered by the side protection covers and the end surfaces of the end caps are covered by the end protection covers. At the same time, seal members are attached to the lower edges of the side protection covers and the end protection covers. As a result, the mechanical strength of the bearing is large and there is no fear of damage to the roller type linear movement guide bearing due to a fall or the like. Furthermore, the user himself is not required to procure and attach the outside-fitting dust seal so that the use of the roller type linear movement guide bearing is more easily facilitated. Moreover, there is no need to fill the space partitioned by the outside-fitting seals with a large amount of grease. Thus, a roller type linear movement guide bearing whose cost for maintenance is low can be easily provided.

What is claimed is:

1. In a roller type linear movement guide bearing capable of linear movement in an axial direction along a raceway surface, the linear movement guide bearing including a pair of roller trains each having a plurality of rollers infinitely circulating while rolling in contact with the raceway surface, a main body supporting a load through the roller trains and accommodating the pair of roller trains respectively at both sides of a vertical center wall, the roller trains being guided by side surfaces of the vertical center wall, and end caps respectively attached to axial opposite ends of the main body and having curved paths formed therein for making a U-turn of the roller trains in the end caps, the improvement comprising:

a pair of side protection covers for covering both lateral sides of the main body and both side surfaces of the end caps and for guiding the roller trains;

a pair of end protection covers for covering the axial end surfaces of the end caps;

a first pair of seal members respectively fixed to lower edges of the pair of side protection covers so as to be slidably in contact with the raceway surface; and a second pair of seal members respectively fixed to lower edges of the pair of end protection covers so as to be slidably in contact with the raceway surface.

2. The improvement in a roller type linear movement guide bearing according to claim 1, wherein each of the pair of side protection covers has lip portions formed in a lower edge, the lip portions extending axially and having a recess formed therebetween.

* * * * *